(12) United States Patent
Yuyama et al.

(10) Patent No.: US 6,181,982 B1
(45) Date of Patent: Jan. 30, 2001

(54) DRUG DISPENSER AND QUANTITY INPUT DEVICE

(75) Inventors: Shoji Yuyama; Naoki Koike; Hirohisa Shimizu, all of Toyonaka (JP)

(73) Assignee: Kabushiki Kaisha Yuyama Seisakusho, Osaka (JP)

( * ) Notice: Under 35 U.S.C. 154(b), the term of this patent shall be extended for 0 days.

(21) Appl. No.: 09/394,677

(22) Filed: Sep. 13, 1999

Related U.S. Application Data

(62) Division of application No. 09/028,663, filed on Feb. 24, 1998, now abandoned.

(30) Foreign Application Priority Data

Feb. 26, 1997 (JP) .................................................. 9-42134

(51) Int. Cl.$^7$ .................................................. G06F 17/00
(52) U.S. Cl. .................. 700/236; 700/244; 700/242; 700/240; 700/241; 221/2; 221/7
(58) Field of Search .................. 700/240, 244, 700/236, 235, 242, 241; 709/3

(56) References Cited

U.S. PATENT DOCUMENTS

| | | |
|---|---|---|
| 3,491,870 | 1/1970 | Isserstedt . |
| 3,921,196 | 11/1975 | Patterson . |
| 4,107,777 | 8/1978 | Pearson et al. . |
| 4,418,277 | 11/1983 | Tremmel et al. . |
| 4,655,026 | 4/1987 | Wigoda . |
| 4,780,599 | 10/1988 | Baus . |
| 4,785,969 | 11/1988 | McLaughlin . |
| 4,847,764 | 7/1989 | Halvorson . |
| 5,208,762 | 5/1993 | Charhut et al. . |
| 5,272,321 | 12/1993 | Otsuka et al. . |
| 5,337,919 | 8/1994 | Spaulding et al. . |
| 5,341,854 | * 8/1994 | Zezulka et al. ........................... 141/1 |
| 5,487,603 | * 1/1996 | Hoff et al. ............................ 366/141 |
| 5,511,594 | 4/1996 | Brennan et al. . |
| 5,564,593 | * 10/1996 | East, Sr. ................................... 221/3 |
| 5,597,995 | * 1/1997 | Williams et al. ..................... 235/375 |
| 5,608,643 | 3/1997 | Wichter et al. . |
| 5,768,768 | * 6/1998 | Best ....................................... 29/792 |
| 5,795,515 | * 8/1998 | Liff et al. ................................. 221/2 |
| 5,797,515 | 8/1998 | Liff et al. . |
| 5,832,693 | 11/1998 | Yuyama et al. . |
| 5,838,575 | 11/1998 | Lion . |
| 5,845,255 | * 12/1998 | Maynud ................................... 705/3 |
| 5,852,911 | 12/1998 | Yuyama et al. . |
| 5,867,820 | * 2/1999 | Cureton et al. .......................... 705/1 |
| 5,905,653 | * 5/1999 | Higham et al. .................. 364/479.14 |
| 5,907,493 | * 5/1999 | Boyer et al. ..................... 364/479.11 |
| 5,993,046 | * 11/1999 | McGrady et al. .............. 364/479.01 |

\* cited by examiner

Primary Examiner—Christopher P. Ellis
Assistant Examiner—Michael E. Butler
(74) Attorney, Agent, or Firm—Wenderoth, Lind, & Ponack, L.L.P.

(57) ABSTRACT

A device which can reduce the workload on operators during replenishment and stocktaking of drugs stored in a drug dispenser. The drug dispenser has a memory for storing data on the initial number of drugs in each of the drug feeders, a processor for calculating the number of drugs currently remaining in each drug feeder by subtracting the number of drugs discharged from each feeder from the initial number of drugs in each drug feeder, and a display for displaying the name of drugs if the number of drugs currently remaining in any drug feeder is smaller than a predetermined value. With this arrangement, an operator can easily see which drug feeders are short of drugs without directly checking the respective feeders by removing them from shelves. The workload on operators for drug replenishment is thus reduced.

1 Claim, 8 Drawing Sheets

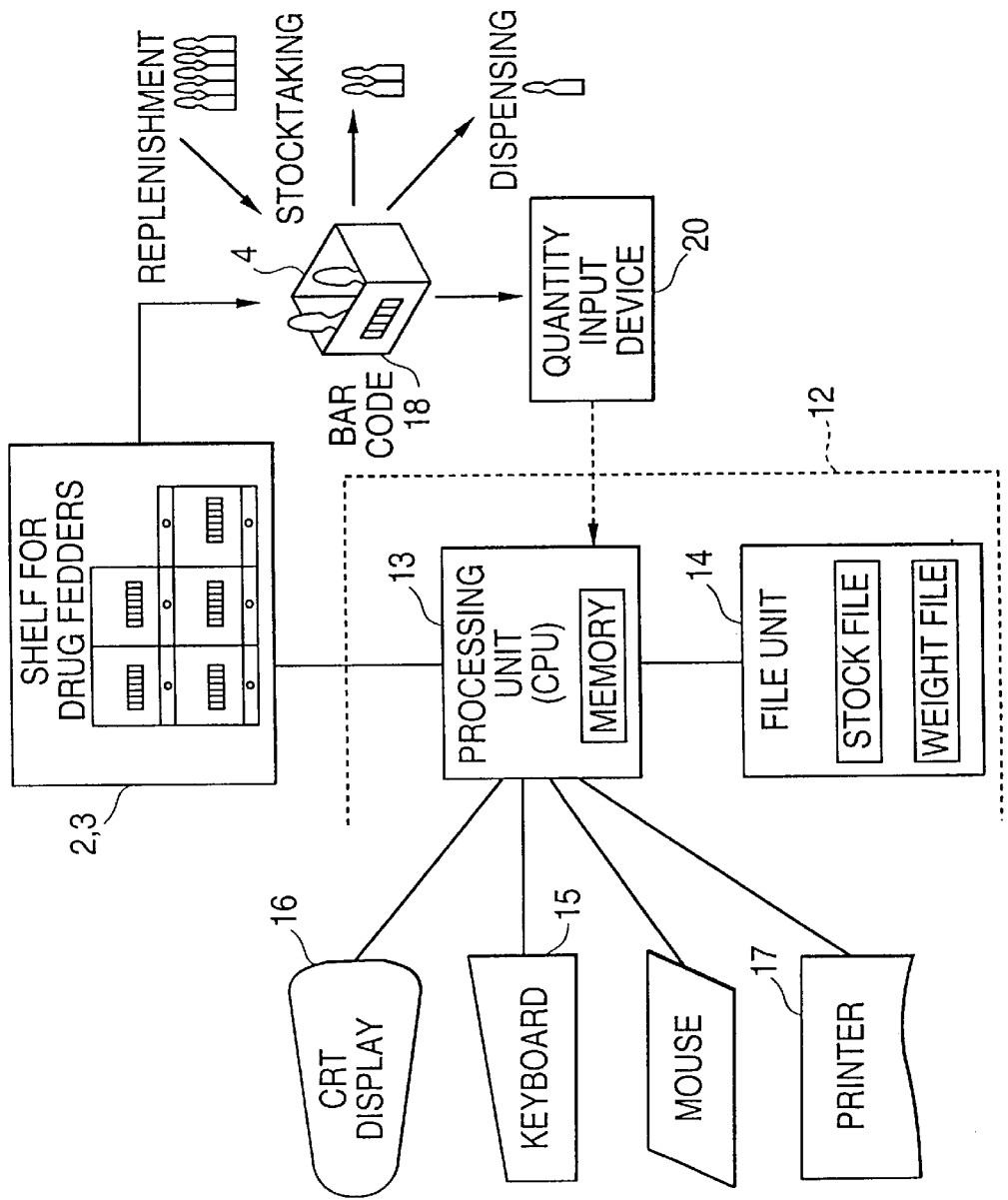

FIG. 3A (STOCK FILE REGISTER) 1996.11.30

| DRUG CODE | DRUG NAME | DRUG FEEDER NO. | SHELF NO. | MIN. STOCK NUMBER | STANDARD REPLENISH NUMBER | CURRENT STOCK NUMBER | ACCUMULATED REPLENISH NUMBER | ACCUMULATED DISPENSED NUMBER |
|---|---|---|---|---|---|---|---|---|
| YAKUI | DRUG E | 085 | 53 | 20 | 10 | 18 | 30 | 12 |
| YAKUE | DRUG A | 137 | 13 | 10 | 10 | 9 | 20 | 11 |
| YAKUSHI | DRUG C | 062 | 32 | 30 | 20 | 25 | 120 | 95 |
| YAKUTE | DRUG D | 129 | 22 | 20 | 30 | 37 | 240 | 203 |
| YAKUHI | DRUG B | 108 | 41 | 10 | 30 | 13 | 150 | 137 |

REGISTERED  END

FIG. 3B (WEIGHT FILE REGISTER) 1996.11.30

| DRUG FEEDER NO. | ID CODE | DRUG FEEDER WEIGHT [g] | DRUG UNIT WEIGHT [g] |
|---|---|---|---|
| 062 | 062 | 700 | 3 |
| 085 | 085 | 600 | 12 |
| 108 | 108 | 600 | 6 |
| 129 | 129 | 700 | 3 |
| 137 | 137 | 500 | 24 |

REGISTERED  END

FIG. 4A

LIST OF DRUGS TO BE REPLENISHED　　　(REPLENISHMENT OF DRUG)　　　1996.11.30

(INPUTTING ACTUAL REPLENISH NUMBER)

(IN THE ORDER OF SHELF NO.)

| DRUG CODE | DRUG NAME | DRUG FEEDER NUMBER | SHELF NUMBER | MIN. STOCK NUMBER | CURRENT STOCK NUMBER | STANDARD REPLENISHED NUMBER | ACTUAL REPLENISHED NUMBER |
|---|---|---|---|---|---|---|---|
| YAKUI | DRUG A | 137 | 13 | 10 | 9 | 10 | |
| YAKUSHI | DRUG C | 062 | 32 | 30 | 25 | 20 | |
| YAKUE | DRUG E | 085 | 53 | 20 | 18 | 10 | 30 |

REPLENISHMENT REGISTER　　　END

FIG. 4B

* LIST OF DRUGS TO BE REPLENISHED *　　　1996.11.30

(IN THE ORDER OF SHELF NO.)

| DRUG CODE | DRUG NAME | DRUG FEEDER NUMBER | SHELF NUMBER | MIN. STOCK NUMBER | CURRENT STOCK NUMBER | STANDARD REPLENISHED NUMBER | ACTUAL REPLENISHED NUMBER |
|---|---|---|---|---|---|---|---|
| YAKUE | DRUG A | 137 | 13 | 10 | 9 | 10 | |
| YAKUSHI | DRUG C | 062 | 32 | 30 | 25 | 20 | |
| YAKUI | DRUG E | 085 | 53 | 20 | 18 | 10 | |

FIG. 5

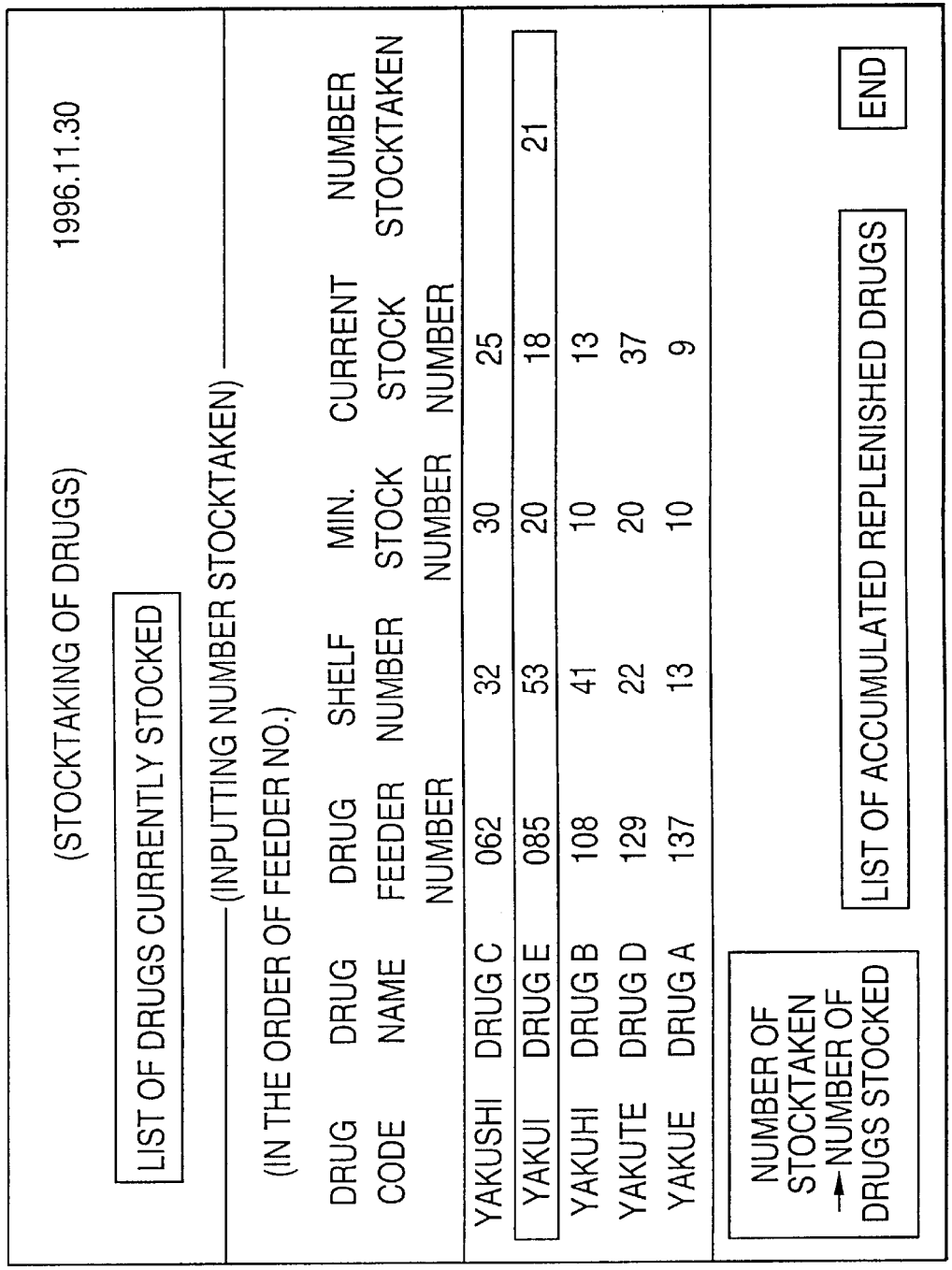

(STOCKTAKING OF DRUGS)  1996.11.30

LIST OF DRUGS CURRENTLY STOCKED (INPUTTING NUMBER STOCKTAKEN)
(IN THE ORDER OF FEEDER NO.)

| DRUG CODE | DRUG NAME | DRUG FEEDER NUMBER | SHELF NUMBER | MIN. STOCK NUMBER | CURRENT STOCK NUMBER | NUMBER STOCKTAKEN |
|---|---|---|---|---|---|---|
| YAKUSHI | DRUG C | 062 | 32 | 30 | 25 | |
| YAKUI | DRUG E | 085 | 53 | 20 | 18 | 21 |
| YAKUHI | DRUG B | 108 | 41 | 10 | 13 | |
| YAKUTE | DRUG D | 129 | 22 | 20 | 37 | |
| YAKUE | DRUG A | 137 | 13 | 10 | 9 | |

NUMBER OF STOCKTAKEN → NUMBER OF DRUGS STOCKED

LIST OF ACCUMULATED REPLENISHED DRUGS

END

FIG. 6

* LIST OF ACCUMULATED REPLENISHED DRUGS *   1996.11.30

TERM: 1996.11.01 ~ 1996.11.30

(IN THE ORDER OF FEEDER NO.)

| DRUG CODE | DRUG NAME | DRUG FEEDER NO. | SHELF NO. | ACCUMULATED REPLENISHED NUMBER | ACCUMULATED DISPENSED NUMBER |
|---|---|---|---|---|---|
| YAKUSHI | DRUG C | 062 | 32 | 120 | 95 |
| YAKUI | DRUG E | 085 | 53 | 30 | 12 |
| YAKUHI | DRUG B | 108 | 41 | 150 | 137 |
| YAKUTE | DRUG D | 129 | 22 | 240 | 203 |
| YAKUE | DRUG A | 137 | 13 | 20 | 11 |

DRUG DISPENSER AND QUANTITY INPUT DEVICE

This is a divisional application of Ser. No. 09/028,663, filed Feb. 24, 1998, now abandoned.

BACKGROUND OF THE INVENTION

This invention relates to a drug dispenser for storing and dispensing drugs according to prescriptions, and an input device through which prescribed drug names and their quantities are inputted into the dispensers.

A typical conventional drug dispenser of this type has a plurality of drug feeders set in storage shelves, and discharge means for discharging drugs in the feeders to a predetermined position. The discharge means discharge drugs, according to prescription data entered from outside, from a corresponding feeder.

An operator periodically removes the feeders from the shelves to check the number of drugs remaining in each feeder. If the operator finds any feeder running short of drugs, corresponding drugs are taken out of a drug stocker and are put into the feeder.

Such drug replenishment is carried out by an operator in the following manner. First, the operator removes all the drug feeders from the shelves. Then, the operator checks the number of drugs remaining in each feeder, selects feeders that need replenishment, puts the selected feeders on a worktable, memorizes or writes down all the drug names to be replenished, walks to the drug stocker, takes necessary drugs out of the stocker, brings them onto the worktable, puts them into the corresponding feeders, and then puts the feeders back into the shelves.

An operator has to do this troublesome work periodically. The intervals between such replenishment and stocktaking routines have to be sufficiently short, because otherwise some feeders may run out of drugs. If the drug dispenser is operated with some of the feeders empty, the dispenser will stop. This extremely lowers work efficiency.

An object of this invention is to reduce the workload on operators during replenishment and stocktaking of drugs stored in a drug dispenser.

SUMMARY OF THE INVENTION

According to this invention, there is provided a drug dispenser comprising a plurality of drug feeders in which are stored different kinds of drugs, a discharge means for discharging prescribed drugs from corresponding ones of the drug feeders according to a prescription, a memory means for storing data on the initial number of drugs in each of the drug feeders, a processing means for calculating the number of drugs currently remaining in each of the drug feeders by subtracting the number of drugs discharged from each of the drug feeders from the initial number of drugs in each of the drug feeders, and a display means for displaying the names of drugs if the number of drugs currently remaining in the any drug feeder is smaller than a predetermined value. A sensor may be provided to detect the number of drugs currently remaining in each of the drug feeders.

The drug dispenser according to this invention has a function of displaying a drug name if the number of drugs remaining in a corresponding drug feeder decreases below a predetermined value. An operator can thus easily see which drug feeders are short of drugs without the need to take out and look into the feeders.

Every time drugs are supplied into a feeder, a predetermined number may be added to the number of drugs remaining in the particular feeder before drugs are supplied. This eliminates the necessity to renew the number of drugs remaining in each feeder by inputting the number of drugs replenished every time drugs are replenished. Ordinarily, drugs in one box or two boxes are supplied into a feeder. Thus, the number of drugs supplied at one time is usually "predetermined" for each drug type, so that it is possible to use the "predetermined number".

The names of drugs to be replenished may be displayed in the form of a list so that an operator can see the drug names more easily. Further, the drug names may be arranged in the order of their numbers. With this arrangement, drugs can be more easily taken out of the drug stocker because drugs are usually arranged in the order of their numbers in the stocker.

The displayed, drug names may be printed out by a printer so that an operator does not have to memorize or write down the drug names.

From another aspect of this invention, there is provided an input device comprising an reader means for reading identification data affixed to each of a plurality of drug feeders of a drug dispenser, means for determining the name of drugs in the each drug feeder based on the identification data read by the reader means, a weighing means for weighing the each drug feeder containing drugs, a processing means for calculating the weight of the drugs in the each drug feeder based on the weight data obtained by the weighing means and calculating the number of drugs currently remaining in the each drug feeder by dividing the weight of the drugs in the each drug feeder by the unit weight of the drugs in the each drug feeder, and a transmission means for transmitting data on the drug names and the number of drugs remaining in the each drug feeder to the drug dispenser.

The reader means reads and displays the name of drugs in each feeder. The number of drugs in any feeder and the drug name are transmitted to the drug dispenser. Based on this data, the number of drugs remaining in each feeder can be renewed easily.

There is also provided an input device comprising a reader means for reading identification data affixed to each of the plurality of drug feeders of the drug dispenser, and a transmission means for transmitting data, on drug names obtained based on the identification data read by the reader means, to the drug dispenser.

The term "drug names" herein used refers not only to the formal names of drugs but sometimes to abbreviations, code numbers, and other marks and symbols with which operators can specify drug types. The term "drug numbers" herein used refers to every kind of identification numbers and codes assigned to each drug type.

Other features and objects of the present invention will become apparent from the following description made with reference to the accompanying drawings, in which:

BRIEF DESCRIPTION OF THE DRAWINGS

FIG. 2 is a block diagram of the drug dispenser of FIG. 1;

FIG. 3A shows how a stock file is registered;

FIG. 3B shows how a weight file is registered;

FIG. 4A shows how drug replenishment data are registered;

FIG. 4B shows a printout of the names of drugs to be replenished;

FIG. 5 shows how stocktaking is carried out;

FIG. 6 show a printout of cumulative number of drugs supplied into each feeder;

DETAILED DESCRIPTION OF THE PREFERRED EMBODIMENT

Drug dispensers and input devices embodying this invention are described with reference to the accompanying drawings.

Figure 1:
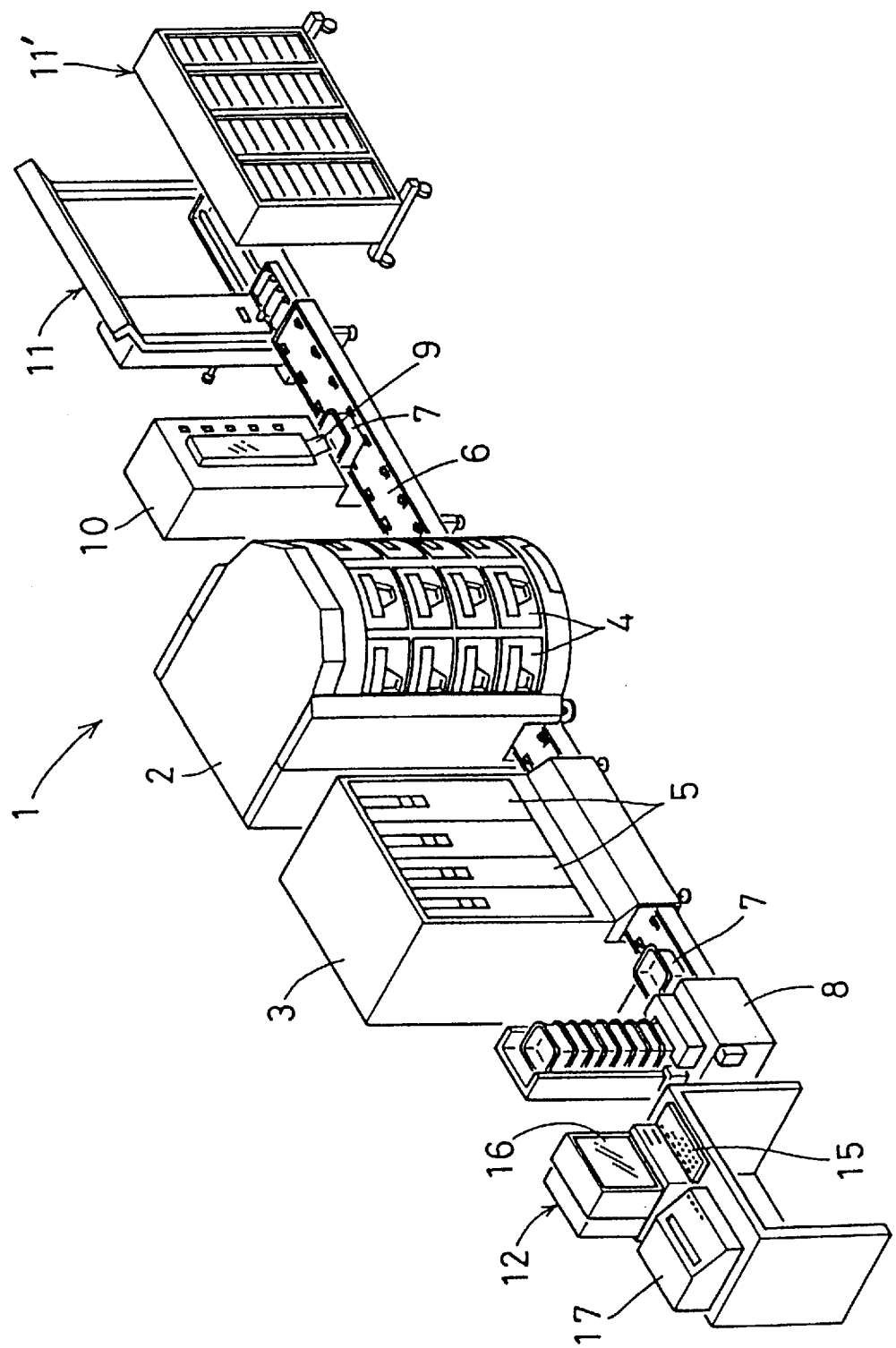
FIG. 1 is a perspective view of a drug dispenser embodying this invention.

The drug dispenser 1 shown in FIG. 1 includes a drug storage shelves 2, 3 each having a plurality of drug feeders 4, 5 in which are stored different kinds of injection fluid ampules, and a drug discharge means (not shown) provided in the shelves 2, 3 for discharging selected injection drugs from the shelves 2, 3 into buckets 7 which are carried on a conveyor 6 extending through the shelves 2, 3.

Each feeder 4 is an open-topped box and is removable from the laterally rotatable shelf 2. Any feeder 4 removed from the shelf 2 is hand-carriable. Drugs are put in the respective feeders 4 from their open tops and the feeders thus filled with drugs are set in the shelf. The feeders 5 can be drawn out of the shelf 3 but cannot be removed from the shelf 3. Ampules can be arranged in a plurality of rows in each feeder 5.

Buckets 7 are deposited one at a time on the conveyor 6 from a bucket stocker 8. Necessary drugs are put in the respective buckets 7 from selected feeders 4, 5 of the shelves 2, 3. A list 9 of drugs is put in each bucket from a printer unit 10. Then, the buckets are stacked in racks 11, 11'.

The drug dispenser 1 of this embodiment is comprehensively controlled by a computer 12. Referring to FIG. 2, the computer 12 comprises a processing unit 13 and file unit 14 connected to the processing unit 13. Connected to the processing unit 13 are the shelves 2, 3, bucket stocker 8, and printer unit 10.

The computer 12 is connected online to a host computer so that prescription data are entered from the host computer directly into the processing unit 13 of the computer 12. Based on prescription data received from the host computer or a keyboard 15, the processing unit 13 controls the shelves 2, 3, bucket stocker 8, and printer unit 10 to dispense drugs, feed buckets 7, and print drug lists 9.

The computer 12 also checks the quantity of drugs in each feeder 4, 5 as discussed next. This is done by entering the initial quantity of drugs in each feeder 4, 5 into the file unit 14 through a keyboard 15 or a mouse, subtracting the quantity of drugs discharged every time drugs are discharged from each feeder, and adding the quantity of drugs put in each feeder every time drugs are put in each feeder. When the quantity of drugs in any feeder drops below a predetermined level, the processing unit 13 indicates the name of drugs to be put in this feeder on a display 16. By checking the display 16, an operator can instantly see which drug is running short without the need to check the feeders 4, 5.

The quantity of drugs remaining in each feeder, cumulative quantity of drugs supplied into each feeder, and cumulative quantity of drugs discharged from each feeder are recorded in the file unit 14 as a stock file. The stock file may also be displayed on the display 16 in the form of a stock list as shown in FIG. 3A. The term "shelf number" as used in FIG. 3A refers to the serial number assigned to each drug storage area in each shelf. Such serial numbers make it easier for an operator to locate the drugs. Drug codes are abbreviations for drug names, which the computer 12 uses in handling drug names.

Description is now made of "standard number of drugs to be replenished". When the stock of any kind of drugs, especially injection drugs, drops below a predetermined level, drugs of the corresponding kind are taken out from the drug stocker in a necessary amount (or number of drugs) and supplied into the respective feeder or feeders 4, 5. This value (i.e. the number of drugs to be replenished into each feeder) is recorded in the file unit 14 as the "standard number of drugs to be replenished". With this arrangement, by simply designating the name of drugs that need replenishment, the computer automatically renews the drug stock data by adding the standard number of drugs to be replenished to the number of drugs currently remaining in each feeder.

The number of drugs currently remaining in each feeder may be calculated by weighing the drugs in each feeder 4, 5 with weight sensors mounted on the feeders 4, 5, and dividing the thus detected weight by the unit weight of the drugs in each feeder. When the total weight of drugs in each feeder 4, 5 and the unit weight of drugs in each feeder 4, 5 are entered into the file unit 14, this data are also displayed on the display 16 as shown in FIG. 3B. ID codes shown are reference codes indicating the kinds of drugs.

The names of drugs that need replenishment are listed on the display 6, as shown in FIG. 4A, so that an operator can instantly see which drugs need to be fetched from the storage shelf. The operator replenishes necessary drugs into corresponding feeders 4, 5 while consulting the display 16, puts the feeders 4, 5 back into the shelves 2, 3, operates the keyboard 15 or mouse to highlight the line corresponding to the drug that has been refilled (drug C in FIG. 4A), and presses a refill registration button.

The computer thus renews the stock data by adding the standard number of drugs to be replenished, which is 20 in this case, to the number of drugs remaining in each feeder. To replenish drugs by a number other than the standard number, the kind of drugs that needs replenishment (e.g. drug E in FIG. 4A) is highlighted, and the number of drugs actually replenished is entered into the corresponding space of the list. When replenishment is completed for all the drug types indicated on the display, a replenishment completion button is pressed.

If drugs have to be replenished by taking drugs out of a stock shelf, a list of the drugs to be replenished may be printed by a printer 17 provided beside the computer 12. Such a list makes it unnecessary for an operator to memorize or write down drug names.

For stocktaking, in which an operator checks if the data in the file unit 14 of the drug dispenser 1 are correct by actually looking into the feeders 4, 5, the computer 12 displays a stocktaking mode screen on the display 16 as shown in FIG. 5. If the actual number of drugs in any feeder does not coincide with the number indicated on the display, the number on the display is corrected to the actual number. Such periodical stocktaking increases the reliability of stock data on drugs in the feeders 4, 5.

The cumulative number of drugs replenished and that of drugs discharged may be printed out for each kind of drugs as shown in FIG. 6.

In this embodiment, when any feeder 4, 5 is replenished with drugs, an operator controls the keyboard 15 to highlight the name of the drug that has been reprenished and presses the replenishment registration button to renew the stock data. The input device shown in FIG. 7 makes such stock data renewal easier.

Figure 7:
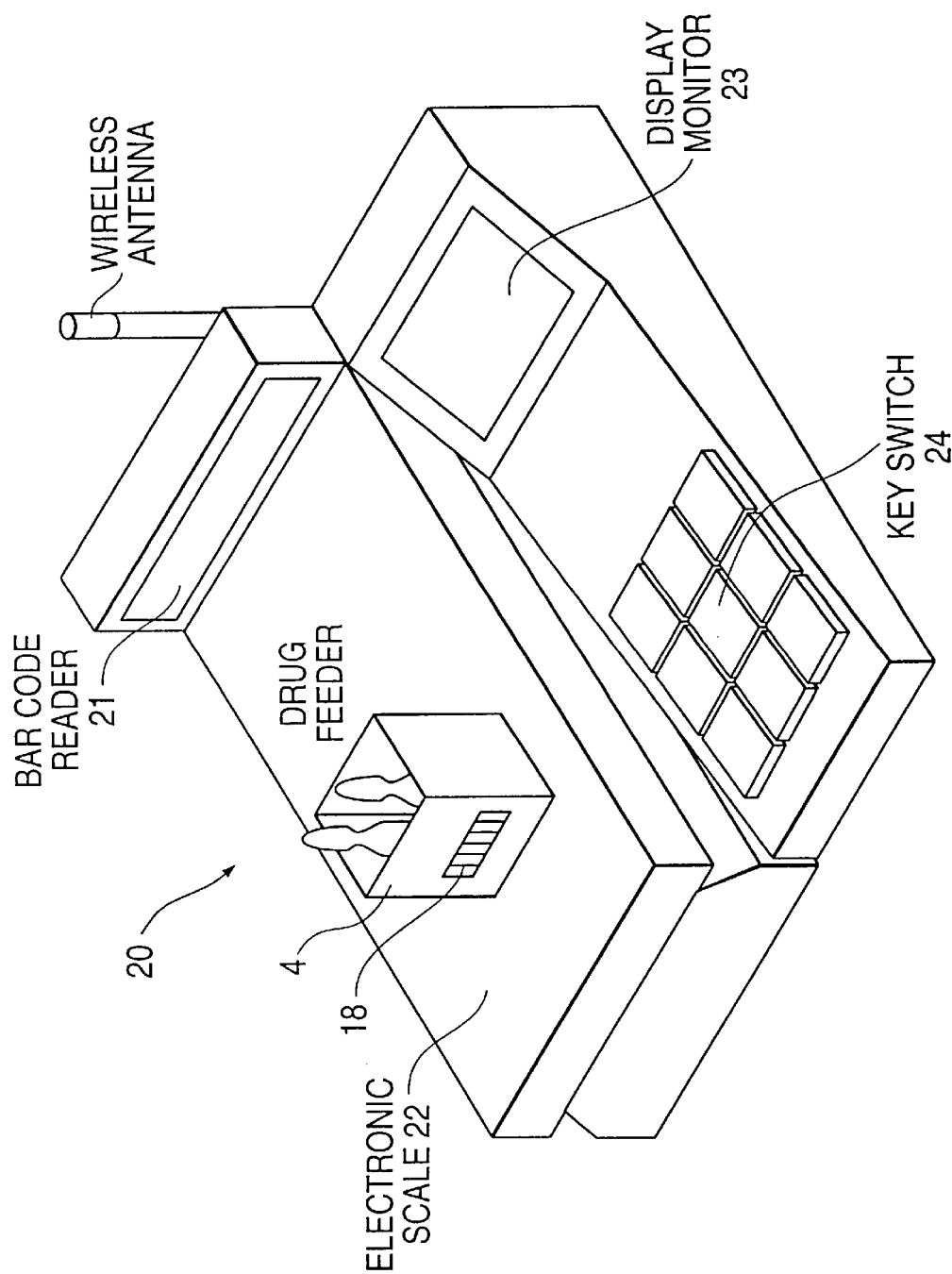
FIG. 7 is a perspective view of an input device embodying this invention.
Figure 8:
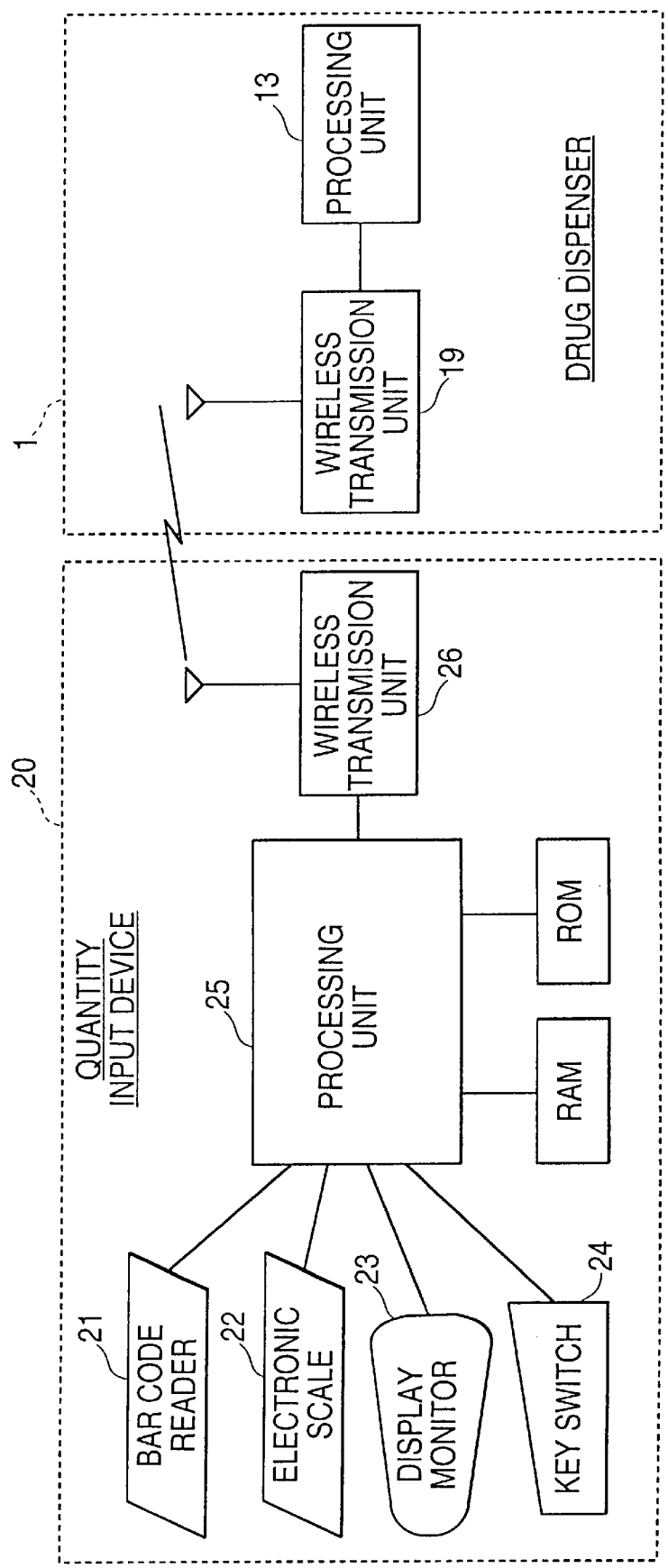
FIG. 8 is a block diagram of the input device of FIG. 7.

As shown in FIGS. 7 and 8, the input device 20 comprises a bar code reader 21, an electronic balance 22, a display monitor 23, and keys 24. These parts 21, 22, 23, 24 are connected to a processing unit 25. The bar code reader 21 reads bar codes 18 affixed to the feeders 4 and transmits the coded drug names to the processing unit 25. The balance 22 weighs the total weight of drugs and the feeder 4 put thereon, and transmits the thus measured weight data to the processing unit 25. The processing unit 25 calls from a ROM the unit weight of the drug whose name has been received from the bar code reader 21 and the weight of the feeder 4 itself, and calculates the number of drugs in the feeder 4 based on the data received from the balance 22. The ROM is preferably an EEPROM such as a rewritable flash memory because the data in such a memory is renewable every time a new drug is added. RAM is used as a data processing work area for the processing unit 25.

The processing unit 25 displays the drug names read and their quantities on the display monitor 23. An operator can check if the data displayed is appropriate. If he wishes to correct anything wrong on the screen or write a comment or something like that on the screen, he can do this through the keyswitch 24.

The processing unit 25 transmits renewal data, i.e. data on coded drug names and their quantities (after replenishment) to the drug dispenser 1 through a wireless communication unit 19. The renewal data, is received by a wireless communication unit 19 of the drug dispenser 1. The renewal data thus received is processed by the processing unit 13 and used to renew the stock data file in the file unit 14.

The input device 20 makes it possible to renew the stock data on the drugs in each feeder 4 of the dispenser 1 with high accuracy simply by reading the bar code affixed to any feeder 4 which has been replenished with drugs or which needs stocktaking, and placing this feeder on the electronic balance 22. This makes drug refilling and stocktaking work further easier.

The input device 20 determines the number of drugs in any feeder by weighing this feeder with the electronic balance 22. But the balance 22 may be omitted. In this case, only drug names are transmitted to the drug dispenser 1. Based on the drug names received, the drug dispenser 1 calculates the numbers of drugs to be supplied into the respective feeders and adds these numbers to the numbers of drugs remaining in the respective feeders before replenishment. The input device 20 without the balance 22 is more inexpensive. Instead of the wireless communication unit, data may be transmitted through alternate means e.g. an RS-232C cable.

With the drug dispenser and the input device according to this invention, an operator can easily see which feeders are short of drugs without looking into the respective feeders. After replenishment, the number of drugs remaining in each feeder is renewable easily. Thus, it is possible to reduce the workload on operators during periodical replenishment and stocktaking routines.

What is claimed is:

1. An input device comprising:

a reader means for reading identification data affixed to each of a plurality of drug feeders of a drug dispenser;

means for determining a name of drugs in each of the plurality of drug feeders based on the identification data read by said reader means;

a weighing means for weighing each of the plurality of drug feeders containing drugs;

a processing means for calculating a weight of the drugs in each of the plurality of drug feeders based on the weight data obtained by said weighing means and calculating a number of drugs currently remaining in each of the plurality of drug feeders by dividing the weight of the drugs in each of the plurality of drug feeders by a unit weight of the drugs in each of plurality of drug feeders, respectively; and a transmission means for transmitting data on the drug names and the number of drugs remaining in each of the plurality of drug feeders to the drug dispenser.

* * * * *